United States Patent
Lee et al.

(10) Patent No.: US 12,463,237 B2
(45) Date of Patent: *Nov. 4, 2025

(54) RECHARGEABLE BATTERY

(71) Applicant: SAMSUNG SDI CO., LTD., Yongin-si (KR)

(72) Inventors: Jun Ho Lee, Yongin-si (KR); Youmee Kim, Yongin-si (KR); Seungjun Myoung, Yongin-si (KR); Jeongho Park, Yongin-si (KR); Byongchul Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,824

(22) Filed: May 2, 2024

(65) Prior Publication Data

US 2024/0283001 A1  Aug. 22, 2024

Related U.S. Application Data

(63) Continuation of application No. 17/597,241, filed as application No. PCT/KR2020/009941 on Jul. 28, 2020, now Pat. No. 11,996,511.

(30) Foreign Application Priority Data

Aug. 19, 2019 (KR) ........................ 10-2019-0101315

(51) Int. Cl.
*H01M 10/04* (2006.01)
*H01M 50/109* (2021.01)
(Continued)

(52) U.S. Cl.
CPC ... *H01M 10/0431* (2013.01); *H01M 10/0427* (2013.01); *H01M 50/109* (2021.01);
(Continued)

(58) Field of Classification Search
CPC ......... H01M 10/0431; H01M 10/0427; H01M 10/045; H01M 50/109; H01M 50/124;
(Continued)

(56) References Cited

U.S. PATENT DOCUMENTS 4,316,945 A   2/1982   Marcham et al.
9,496,581 B2  11/2016  Pytlik et al.
(Continued)

FOREIGN PATENT DOCUMENTS

JP   2008091240 A  *  4/2008
JP   2014235941 A  * 12/2014   .......... H01M 2/0222
(Continued)

OTHER PUBLICATIONS

Engineering ToolBos, (2005). Modulus of Rigidity. [online] Available at: https://www.engineeringtoolbox.com/modulus-rigidity-d_946.html [May 5, 2023]. Year: (2005) (Year: 2005).*
(Continued)

*Primary Examiner* — Adam J Francis
(74) *Attorney, Agent, or Firm* — Womble Bond Dickinson (US) LLP (57) ABSTRACT

Disclosed is a rechargeable battery including: an electrode assembly wound with a separator between a first electrode and a second electrode; a first exterior material including an opening receiving the electrode assembly and facing a bottom side of the electrode assembly; a second exterior material covering the opening, and combined to the first exterior material to seal an internal side of the first exterior material; and a reinforcing member having greater rigidity than the first exterior material and the second exterior material, disposed between the electrode assembly and the first exterior material, and including a side wall for surrounding a lateral side of the electrode assembly.

12 Claims, 6 Drawing Sheets

(51) Int. Cl.
  *H01M 50/124* (2021.01)
  *H01M 50/183* (2021.01)
  *H01M 50/342* (2021.01)
  *H01M 50/531* (2021.01)
(52) U.S. Cl.
  CPC ....... *H01M 50/124* (2021.01); *H01M 50/183* (2021.01); *H01M 50/3425* (2021.01); *H01M 50/531* (2021.01)
(58) Field of Classification Search
  CPC ........... H01M 50/183; H01M 50/3425; H01M 50/531; H01M 50/591; H01M 50/595; H01M 50/131; H01M 50/153; H01M 50/181; H01M 50/342; H01M 50/586; H01M 50/105; H01M 50/176; H01M 50/186; H01M 50/557; H01M 50/559
  See application file for complete search history.

(56) References Cited

U.S. PATENT DOCUMENTS

| | | | | |
|---|---|---|---|---|
| 2004/0038125 | A1* | 2/2004 | Kim | H01M 50/186 |
| | | | | 429/185 |
| 2004/0191622 | A1* | 9/2004 | Han | H01M 50/119 |
| | | | | 429/174 |
| 2011/0159328 | A1* | 6/2011 | Yeo | H01M 10/0481 |
| | | | | 429/162 |
| 2012/0214023 | A1* | 8/2012 | Koh | H01M 50/55 |
| | | | | 429/186 |
| 2013/0029212 | A1* | 1/2013 | Hong | H01M 50/178 |
| | | | | 269/21 |
| 2015/0064548 | A1* | 3/2015 | Hong | H01M 50/105 |
| | | | | 429/163 |
| 2015/0147631 | A1 | 5/2015 | Tsuda et al. | |
| 2015/0243938 | A1 | 8/2015 | Kim et al. | |
| 2017/0250384 | A1* | 8/2017 | Kim | H01M 50/55 |
| 2018/0175451 | A1* | 6/2018 | Inoue | H01M 50/14 |
| 2019/0020036 | A1 | 1/2019 | Kim et al. | |

FOREIGN PATENT DOCUMENTS

| | | |
|---|---|---|
| KR | 2003-0096717 A | 12/2003 |
| KR | 10-0484103 B1 | 4/2005 |
| KR | 10-2014-0034975 A | 3/2014 |
| KR | 10-2017-0101007 A | 9/2017 |
| KR | 10-2017-0114404 A | 10/2017 |
| KR | 10-2018-0058333 A | 6/2018 |

OTHER PUBLICATIONS

International Search Report for corresponding Application No. PCT/KR2020/009941 dated Nov. 11, 2020, 4pp.
Engineering ToolBox, (2005), Modulus of Rigidity. [online] Available at https://www.engineeringtoolbox.com/modulus-rigidity-d_946.html [May 25, 2023]. (Year: 2005).
Korean Office Action issued in corresponding KR Application No. 10-2019-0101315, dated Mar. 6, 2025, 5 pages.

* cited by examiner

RECHARGEABLE BATTERY

CROSS-REFERENCE TO RELATED APPLICATIONS

This application is a continuation of U.S. patent application Ser. No. 17/597,241, filed on Dec. 29, 2021, which is a U.S. National Phase Patent Application of International Application Number PCT/KR2020/009941, filed on Jul. 28, 2020, which claims priority to and the benefit of Korean Patent Application Number 10-2019-0101315, filed on Aug. 19, 2019, the entire content of each of which is incorporated herein by reference.

TECHNICAL FIELD

The present invention relates to a rechargeable battery. More particularly, the present invention relates to a very small rechargeable battery.

BACKGROUND ART

Unlike a primary battery, a rechargeable battery can be repeatedly recharged and discharged. A small-capacity rechargeable battery is used for small portable electronic devices such as mobile phones, notebook computers, camcorders, and the like, while a large-capacity rechargeable battery is used as a motor-driving power source for a hybrid vehicle.

As typical rechargeable batteries, there are a nickel-cadmium (Ni—Cd) battery, a nickel-metal hydride (Ni-MH) battery, a lithium (Li) battery, a lithium ion (Li-ion) battery, etc. Particularly, the lithium ion rechargeable battery has an operating voltage of about thrice as high as that of the Ni—Cd battery or Ni-MH battery that is widely used as a power supply for electronic devices. In addition, the lithium ion rechargeable battery has been widely used because its energy density per unit weight is high.

Particularly, as demands on wearable devices such as headphones, earphones, smartwatches, and medical devices attachable to bodies, using Bluetooth have been recently increasing, needs for very small rechargeable batteries with high energy density are increasing.

It is important for the very small rechargeable batteries to obtain electrical capacity required within a restricted size, structural stability, and safety in use.

The matters described as the background art are only for the purpose of increasing the understanding of the background of the present invention, and should not be taken as acknowledging that they correspond to the related art already known to those skilled in the art.

The above information disclosed in this Background section is only for enhancement of understanding of the background of the invention, and therefore it may contain information that does not form the prior art that is already known in this country to a person of ordinary skill in the art.

DISCLOSURE

The present invention has been made in an effort to provide a rechargeable battery for achieving efficient weight reduction, increasing electrical capacity, and efficiently increasing structural stability and use stability.

An embodiment of the present invention provides a rechargeable battery including: an electrode assembly wound with a separator between a first electrode and a second electrode; a first exterior material including an opening receiving the electrode assembly and facing a bottom side of the electrode assembly; a second exterior material covering the opening, and combined to the first exterior material to seal an internal side of the first exterior material; and a reinforcing member having greater rigidity than the first exterior material and the second exterior material, disposed between the electrode assembly and the first exterior material, and including a side wall for surrounding a lateral side of the electrode assembly.

The reinforcing member may further include an upper wall for surrounding a top side of the electrode assembly and may have a can shape for receiving the electrode assembly.

The reinforcing member may be made of a metal material, and may further include a first insulating member for surrounding the electrode assembly between the electrode assembly and the reinforcing member, and insulating the electrode assembly from the reinforcing member.

The rechargeable battery may further include an electrode tab combined to the electrode assembly, extending from the electrode assembly, and drawn out to an outside of the first exterior material.

The first insulating member may include a through-hole which the electrode tab penetrates, and the electrode tab may be drawn out between the first insulating member and the reinforcing member through the through-hole, and an insulating material may be coated on a portion contacting the reinforcing member.

The rechargeable battery may further include a second insulating member installed on an external side of the first insulating member to close and seal the through-hole.

The first exterior material may include a first edge portion surrounding a circumference of the opening and extending to be distant from the opening, the second exterior material may include a second edge portion provided on the first edge portion and forming a terrace portion, and the electrode tab may pass through the terrace portion and may be drawn out to an outside of the first exterior material.

The terrace portion may be folded to be closely attached to an exterior side of the first exterior material.

The rechargeable battery may further include a fixing ring for surrounding the folded terrace portion and fixing the terrace portion to be closely attached to the exterior side of the first exterior material.

The electrode tab may be combined to a lateral side of the electrode assembly and may be drawn out to the outside.

The electrode tab may include: a first extension extending to the second exterior material along a lateral side of the electrode assembly; a second extension extending along the terrace portion from the first extension and drawn out to an outside; and a bending portion connecting between the first extension and the second extension and bent.

The terrace portion may include a draw-out hole through which the electrode tab penetrates and is drawn out, and may further include a vent sealing portion sealing the draw-out hole and bursting when an internal pressure of the first exterior material increases.

The rechargeable battery may have a coin shape in which a ratio of diameter to height is equal to or greater than 1.

According to the embodiment of the present invention, the rechargeable battery for efficiently obtaining the weight reduction, increasing the electrical capacity, and efficiently increasing the structural stability and use stability is provided.

MODE FOR INVENTION

In the following detailed description, only certain embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

In this specification, redundant description of the same constituent elements is omitted.

It is to be understood that when one component is referred to as being "connected" or "coupled" to another component, it may be connected or coupled directly to the other component or may be connected or coupled to the other component with another component intervening therebetween. On the other hand, it is to be understood that when one component is referred to as being "connected or coupled directly" to another component, it may be connected or coupled to the other component without another component intervening therebetween.

It is also to be understood that the terminology used herein is only used for the purpose of describing particular embodiments, and is not intended to limit the invention.

Singular forms are to include plural forms unless the context clearly indicates otherwise.

It will be further understood that terms "comprises" and "have" used in the present specification specify the presence of stated features, numerals, steps, operations, components, parts, or a combination thereof, but do not preclude the presence or addition of one or more other features, numerals, steps, operations, components, parts, or a combination thereof.

As used herein, the term "and/or" includes any plurality of combinations of items or any of a plurality of listed items. "A or B" may include "A", "B", or "A and B".

An embodiment of the present invention relates to a rechargeable battery, its size may be various, and it may preferably be a very small rechargeable battery to be used to headphones, earphones, smartwatches, and wearable devices.

The embodiment of the present invention is applicable to various shapes and types of rechargeable batteries such as square-shaped, cylindrical, or pin-shaped, and preferably, it may be a coin-type or button-type battery. The coin-type or button-type battery has a shape of a thin coin or a button, it may be used as a very small battery, and it may be defined to be a battery with a ratio (height/diameter) of the height (H) to the diameter (L) of the rechargeable battery that is equal to or less than 1.

The coin-type or button-type battery may have a cylindrical shape with a circle in a cross-section shape, and without being limited thereto, it may have an oval or polygonal cross-section shape.

Figure 2:
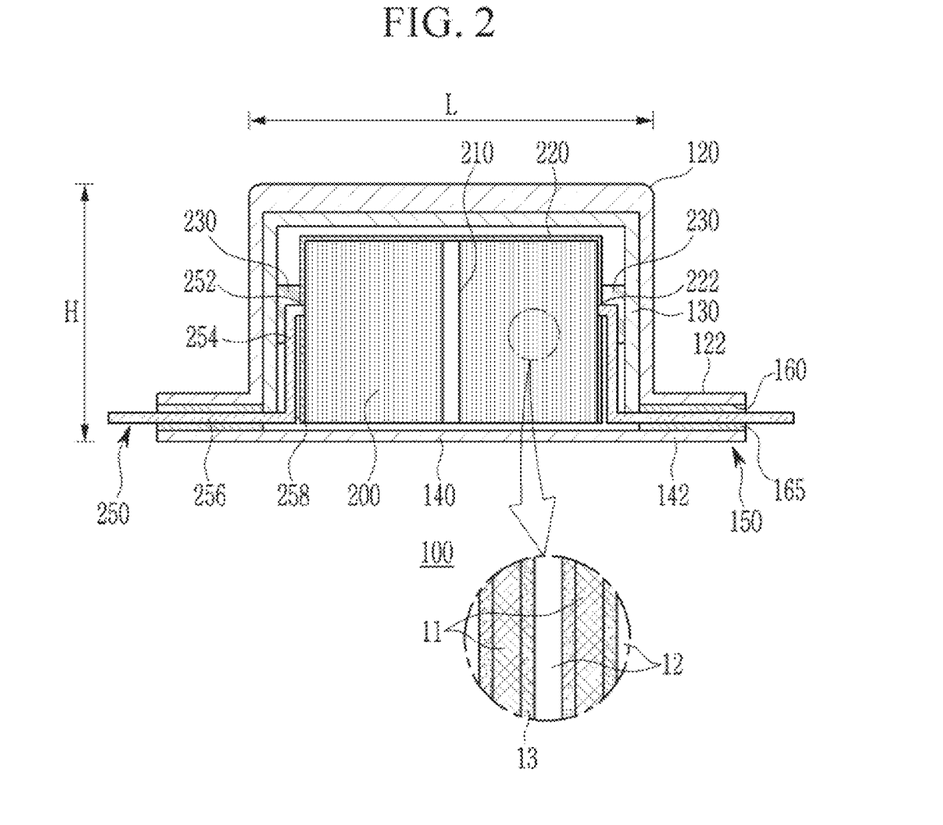
FIG. 2 shows a cross-sectional view of a rechargeable battery of FIG. 1 with respect to a line A-A.

As shown in FIG. 2, the diameter (L) may represent a maximum distance between lateral sides of the first exterior material 120 in which the electrode assembly 200 is installed, and the height (H) may indicate a minimum distance to a flat upper end of the battery from a flat bottom side of the battery, and may be understood as a distance to a top side of the first exterior material 120 from a bottom side of the second exterior material 140.

The rechargeable battery may have various sizes, types, and shapes, and for ease of description, the coin-type battery with a circular cross-section shape will be exemplified.

Figure 1:
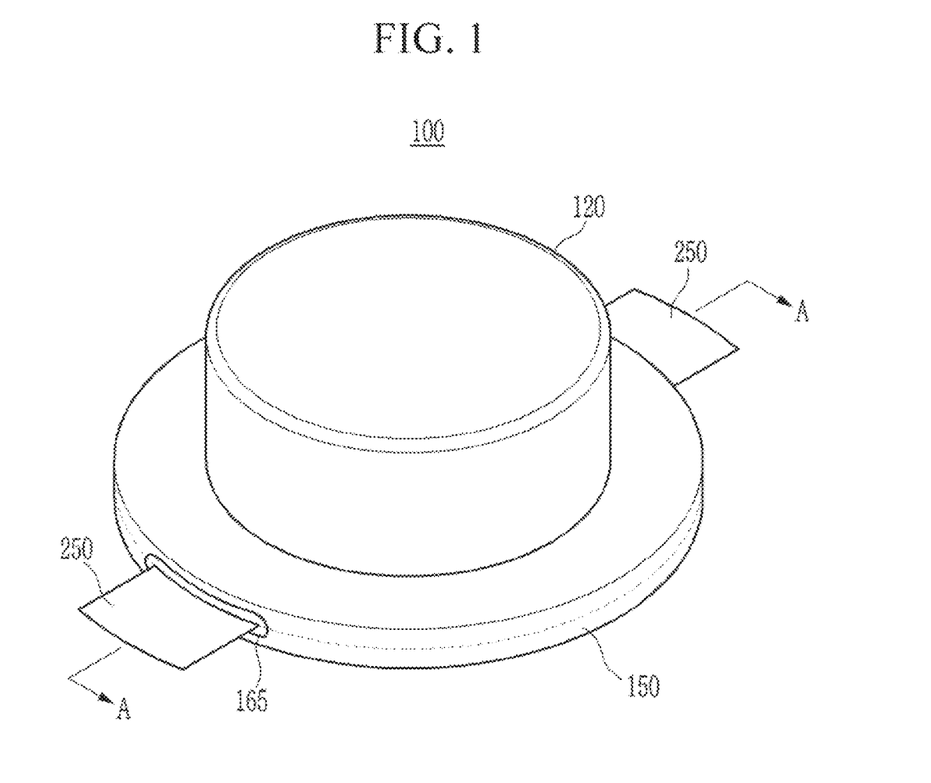
FIG. 1 shows a rechargeable battery according to an embodiment of the present invention.

FIG. 1 shows an appearance of a rechargeable battery 100 according to an embodiment of the present invention, and FIG. 2 shows a cross-sectional view of a rechargeable battery of FIG. 1 with respect to a line A-A.

The rechargeable battery 100 includes, as shown in FIG. 1 and FIG. 2, an electrode assembly 200 wound with a separator 13 between a first electrode 11 and a second electrode 12, a first exterior material 120 receiving the electrode assembly 200 and having an opening facing a bottom side of the electrode assembly 200, a second exterior material 140 covering the opening and combined to the first exterior material 120 to seal an inside of the first exterior material 120, and a reinforcing member 130 having greater rigidity than the first exterior material 120 and the second exterior material 140, disposed between the electrode assembly 200 and the first external film, and including a side wall for surrounding a lateral side of the electrode assembly 200.

The electrode assembly 200 includes a first electrode 11 and a second electrode 12 that may have a coated region and an uncoated region, and the first electrode 11 may be a negative electrode and the second electrode 12 may be a positive electrode, and vice versa.

Figure 3:
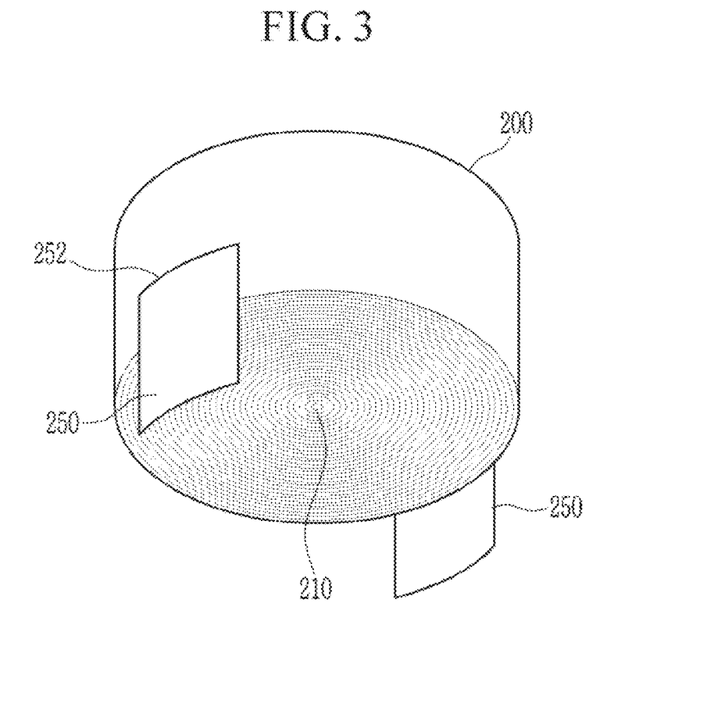
FIG. 3 shows an electrode assembly and an electrode tab installed in a rechargeable battery according to an embodiment of the present invention.

A separator 13 for electrical insulation may be provided between the first electrode 11 and the second electrode 12. FIG. 3 shows an electrode assembly 200 installed in a rechargeable battery 100 according to an embodiment of the present invention.

The electrode assembly 200 may be a stacked type, and preferably, as shown in FIG. 2 or FIG. 3, the first electrode 11, the second electrode 12, and the separator 13 may be wound with respect to the winding axis 210 and may have a jelly-roll shape.

Referring to FIG. 2, the electrode assembly 200 may have a planar top side, a planar bottom side, and a curved lateral side, and the winding axis 210 may be parallel to the height direction of the rechargeable battery 100. That is, the electrode assembly 200 may be disposed so that the top side may face the top side of the first exterior material 120 and the bottom side may face the second exterior material 140.

The first electrode 11 may be a negative electrode, has a long extending strip shape, and includes a negative coated region in which a negative active material layer is applied on a current collector of a metal film (e.g., a foil of Cu) and a negative uncoated region in which no active material is applied. The negative uncoated region may be positioned on one end portion in a length direction of the negative electrode.

The second electrode 12 may be a positive electrode, has a long extending strip shape, and includes a positive coated region in which a positive active material layer is applied on the current collector of the metal film (e.g. a foil of Al) and a positive uncoated region in which no active material is applied. The positive uncoated region may be positioned on one end portion in the length direction of the positive electrode.

An embodiment of the present invention corresponds to a pouch-type rechargeable battery in which the electrode assembly 200 is installed in a pouch, and the pouch may include a first exterior material 120 and a second exterior material 140.

As shown in FIG. 2, in an embodiment of the present invention, the first exterior material 120 may have an opening for receiving the electrode assembly 200 and having an opened bottom side to face the bottom side of the electrode assembly 200. That is, the first exterior material 120 may have a space for receiving the electrode assembly 200 and may have an opened bottom side.

The second exterior material 140 covers the opening and is combined to the first exterior material 120 to seal the first exterior material 120. FIG. 2 illustrates that the second exterior material 140 is combined to a lower portion of the first exterior material 120 to seal an inside of the first exterior material 120 and form a pouch.

The second exterior material 140 may have a flat plate shape, and the first exterior material 120 and the second exterior material 140 may be made of various materials with an electrical insulating property such as a polymer material.

The reinforcing member 130 has greater rigidity than the first exterior material 120 and the second exterior material 140, it is disposed between the electrode assembly 200 and the first external film, and it includes a side wall for surrounding the lateral side of the electrode assembly 200.

FIG. 2 illustrates a reinforcing member 130 disposed in the first exterior material 120. The reinforcing member 130 may have greater rigidity than the first exterior material 120 and the second exterior material 140. For example, the reinforcing member 130 may be made of a metal material such as iron, aluminum, or stainless steel.

Regarding the rechargeable battery 100, the electrode assembly 200 received in the first exterior material 120 made of the polymer may be easily damaged and may be short-circuited when external impacts are applied.

Depending on charging and discharging conditions, a gas may be generated in the pouch by a chemical reaction of the electrode assembly 200, and the pouch may be expanded as an internal pressure increases, which is referred to as a swelling phenomenon.

As the reinforcing member 130 with high rigidity surrounding the electrode assembly 200 in the first exterior material 120 is installed, an embodiment of the present invention may prevent the electrode assembly 200 from being damaged from the external impacts, and may suppress the swelling phenomenon in which the pouch expands as the internal pressure increases.

The reinforcing member 130 may have a side wall for surrounding the lateral side of the electrode assembly 200. The electrode assembly 200 wound with respect to the winding axis 210 may have a great expansion rate in a diameter direction that is perpendicular to the winding axis 210.

To suppress the expansion of the electrode assembly 200 in the diameter direction, the reinforcing member 130 includes a side wall disposed between the electrode assembly 200 and the first exterior material 120 and surrounding the lateral side of the electrode assembly 200.

The reinforcing member 130 may further include an upper wall surrounding the top side of the electrode assembly 200 and may have a can shape for receiving the electrode assembly 200.

For example, the reinforcing member 130 may have a ring shape of the side wall, and as shown in FIG. 2, it may have a can shape including the upper wall disposed between the top side of the electrode assembly 200 and the top side of the first exterior material 120.

The upper wall and the side wall of the reinforcing member 130 may be formed in various ways, for example, they may be individually manufactured and inserted into the first exterior material 120, their contact portion may be welded, and they may be integrally formed by casting.

The reinforcing member 130 may have a circular cross-sectional shape in a like way of the electrode assembly 200 and the first exterior material 120. That is, the upper wall of the reinforcing member 130 may have a circular plate shape, and the side wall may have a ring shape.

The reinforcing member 130 may be made of a metal material, it may surround the electrode assembly 200 between the electrode assembly 200 and the reinforcing member 130, and it may further include a first insulating member 220 for insulating the electrode assembly 200 and the reinforcing member 130.

When the reinforcing member 130 is made of a metal material to obtain rigidity, the electrode assembly 200 may be electrically connected to the reinforcing member 130 to generate a short circuit. Hence, the first insulating member 220 for electrical insulating the electrode assembly 200 and the reinforcing member 130 may be provided.

The first insulating member 220 may be made of an electrical insulating material such as polymers. The first insulating member 220 may be made into a film form to surround the external side of the electrode assembly 200 or may be provided in a cured form to corresponding to the appearance of the electrode assembly 200.

FIG. 2 illustrates a first insulating member 220 for surrounding the external side of the electrode assembly 200 and insulating the electrode assembly 200 and the reinforcing member 130.

A terminal portion electrically connected to the electrode assembly 200 may be provided on the first exterior material 120 or the second exterior material 140, and the rechargeable battery 100 according to an embodiment of the present invention may further include an electrode tab 250 combined to the electrode assembly 200, extending from the electrode assembly 200, and drawn out to the outside of the first exterior material 120 as shown in FIG. 1 to FIG. 3.

FIG. 1 illustrates an electrode tab 250 drawn out to the outside of the first exterior material 120, that is, the outside of the pouch, and FIG. 2 and FIG. 3 illustrate a state that the electrode assembly 200 is combined to the electrode tab 250.

The electrode tab 250 is made of an electrically conductive material, and may be combined to the first electrode 11 or the second electrode 12 of the electrode assembly 200. In an embodiment of the present invention, the electrode tab 250 combined to the first electrode 11 of the electrode assembly 200 may be referred to as a first electrode tab, and the electrode tab 250 combined to the second electrode 12 may be referred to as a second electrode tab.

The electrode tab 250 may extend from the combined unit 252 with the electrode assembly 200 and may be drawn out to the outside of the first exterior material 120, and the drawn out portion may be used as a terminal of the rechargeable battery 100. For example, the portion drawn out to the outside of the pouch of the electrode tab 250 may contact the terminal of the electronic device and may be electrically connected thereto.

An embodiment of the present invention may be a very small coin-type battery, it may be important for the coin-type battery to have a small size and simplify the configuration, and hence, an embodiment of the present invention does not install an additional terminal portion, but directly draws out the electrode tab 250 connected to the electrode assembly 200 to the outside of the pouch and may connect the same to the terminal of the electronic device, which is a merit.

The first insulating member 220 may include a through-hole 222 through which the electrode tab 250 penetrates, the electrode tab 250 is drawn out between the first insulating member 220 and the reinforcing member 130 through the through-hole 222, and an insulating material may be coated on the portion contacting the reinforcing member 130.

The through-hole 222 may be formed in the first insulating member 220 surrounding the electrode assembly 200 to draw out the electrode tab 250 or weld the electrode tab 250 and the electrode assembly 200. The through-hole 222 may be formed on a position that corresponds to the combined unit 252 of the electrode tab 250 on the electrode assembly 200 or a spaced position.

The first insulating member 220 may surround the entire external side of the electrode assembly 200 to insulate the electrode assembly 200, and the electrode tab 250 combined to the electrode assembly 200 according to a method such as welding may be drawn out between the first insulating member 220 and the reinforcing member 130 through the through-hole 222 of the first insulating member 220, as shown in FIG. 2.

The electrode tab 250 may be made of an electrically conductive material, and the portion drawn out between the first insulating member 220 and the reinforcing member 130 needs to be insulated from the reinforcing member 130 made of a metal material.

Accordingly, an insulating material may be coated on the portion where the electrode tab 250 contacts the reinforcing member 130. Therefore, the electrode tab 250 may be electrically insulated from the reinforcing member 130 when drawn out from the electrode assembly 200 through the through-hole 222 to face the reinforcing member 130.

The electrode tab 250 may further include a second insulating member 230 installed to the external side of the first insulating member 220 to close and seal the through-hole 222. FIG. 2 illustrates a second insulating member 230 for closing and sealing the portion of the through-hole 222 of the first insulating member 220.

The through-hole 222 may be formed in the first insulating member 220 to draw out the electrode tab 250 from the electrode assembly 200, and regarding the portion of the through-hole 222, the external side of the electrode assembly 200 or the combined unit 252 of the electrode tab 250 may be exposed to the reinforcing member 130 as a risk, and short circuits may be generated.

Therefore, an embodiment of the present invention may include a second insulating member 230 drawing out the electrode tab 250 through the through-hole 222, and installed on the external side of the first insulating member 220 including the through-hole 222 to obtain an electrical insulating property on the reinforcing member 130.

The second insulating member 230 may have the same type or material as the first insulating member 220, and part of the electrode tab 250 drawn out from the through-hole 222 may be positioned between the second insulating member 230 and the first insulating member 220.

The second insulating member 230 has a tape shape, it may be attached to the external side of the first insulating member 220, and it may be provided as a liquid and may be applied to the external side of the first insulating member 220.

The first exterior material 120 includes a first edge portion 122 surrounding a circumference of the opening and extending to be distant from the opening, the second exterior material 140 includes a second edge portion 142 provided on the first edge portion 122 to form a terrace portion 150, and the electrode tab 250 may penetrate through the terrace portion 150 and may be drawn out to the outside of the first exterior material 120.

The first edge portion 122 may surround the opening in the first exterior material 120 and may extend to be distant from the opening. That is, referring to FIG. 1 and FIG. 2, the first exterior material 120 may have a first edge portion 122 extending to the outside on the circumference of the opened bottom side.

The second edge portion 142 may have a shape that corresponds to the first edge portion 122 on the second exterior material 140, and may be attached to the first edge portion 122 to form a terrace portion 150. The inside of the pouch configured by the first exterior material 120 and the second exterior material 140 may be sealed by formation of the terrace portion 150.

The first edge portion 122 and the second edge portion 142 may be combined to each other by various methods such as a thermal fusion method or use of an adhesive.

The electrode tab 250 may, as shown in FIG. 1 and FIG. 2, extend from the electrode assembly 200 and may be drawn out to the outside through the terrace portion 150. That is, the terrace portion 150 may undergo thermal fusion excluding the portion in which the electrode tab 250 is disposed between the first edge portion 122 and the second edge portion 142.

An embodiment of the present invention does not form an additional opening in the first exterior material 120 or the second exterior material 140, and draws out the electrode tab 250 by using a combined unit between the first exterior material 120 and the second exterior material 140.

The terrace portion 150 may be bent to be closely attached to the lateral side of the first exterior material 120. Accordingly, a volume occupied by the rechargeable battery 100 may be reduced and space use may be increased.

That is, the terrace portion 150 may be formed on the pouch on which the first exterior material 120 is combined to the second exterior material 140, and the terrace portion 150 is folded to be closely attached to the exterior side that corresponds to the lateral side of the electrode assembly 200 on the first exterior material 120 to avoid unnecessarily occupying a space.

In addition, the rechargeable battery 100 may further include a fixing ring 190 for surrounding the folded terrace portion 150, and fixing the terrace portion 150 to be closely attached to the exterior side of the first exterior material 120.

Figure 4:
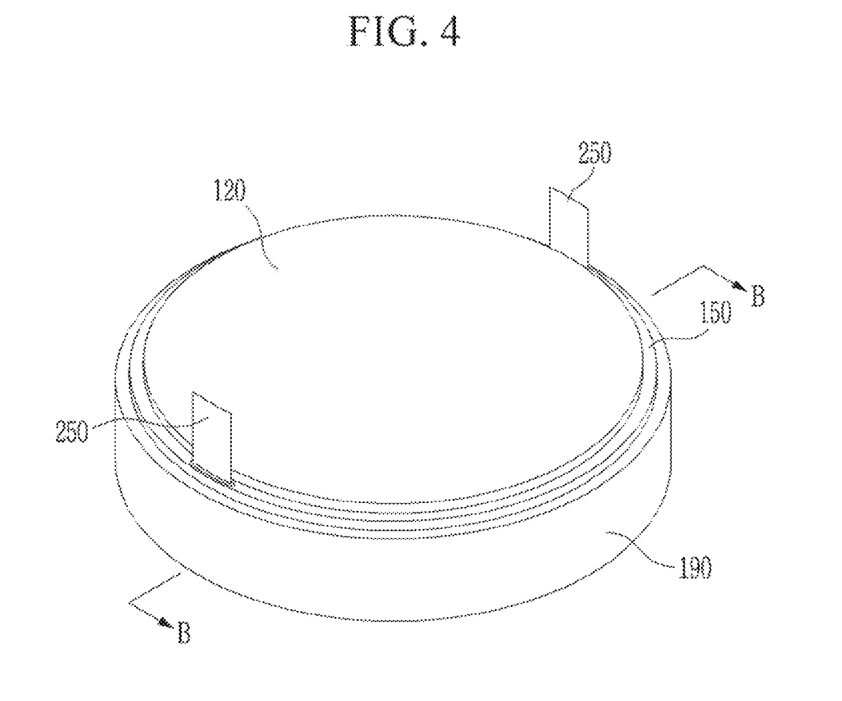
FIG. 4 shows a state in which a fixing ring is combined in a rechargeable battery according to an embodiment of the present invention.
Figure 5:
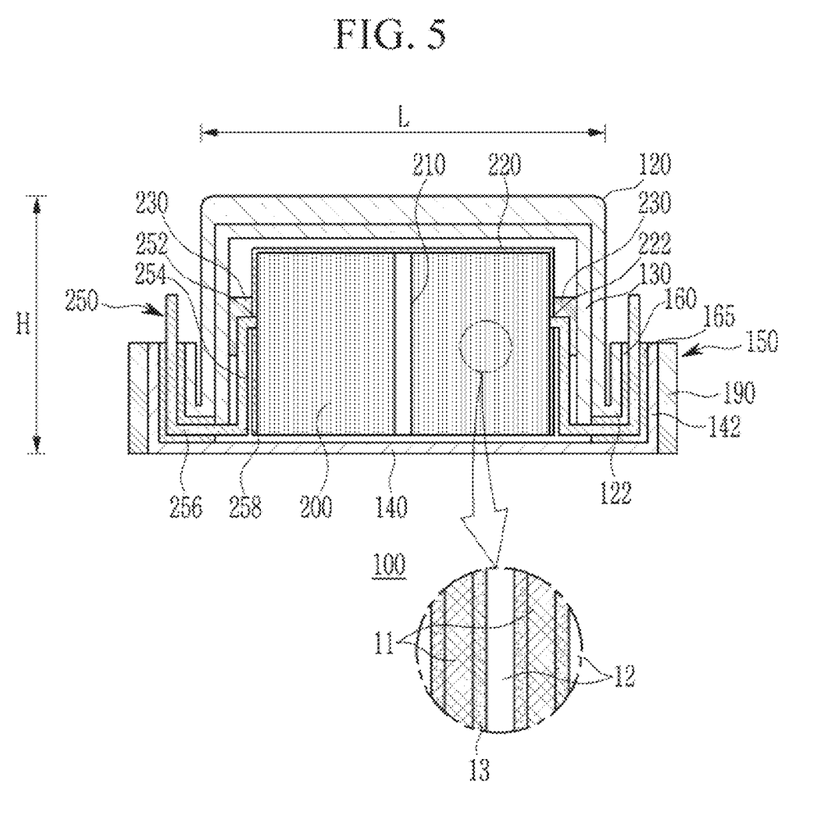
FIG. 5 shows a cross-sectional view of a rechargeable battery of FIG. 4 with respect to a line B-B.

FIG. 4 illustrates a fixing ring 190 for fixing the terrace portion 150 folded to be closely attached to the lateral side of the first exterior material 120, and FIG. 5 shows a cross-sectional view of the rechargeable battery of FIG. 4 with respect to a line B-B.

The fixing ring 190 may be made of various materials. For example, the fixing ring 190 may have great rigidity in a like way of the reinforcing member 130, so it may be made of a metal material and is not limited thereto.

An embodiment of the present invention may stably fix the terrace portion 150 tightly attached to the lateral side of the first exterior material 120 by using the fixing ring 190, and may obtain structural stability of the rechargeable battery 100.

The electrode tab 250 may be combined to the lateral side of the electrode assembly 200 and may be drawn out to the outside. FIG. 2 and FIG. 3 illustrate that the combined unit 252 of the electrode tab 250 is positioned on the lateral side of the electrode assembly 200.

It is important for the very small rechargeable battery to efficiently obtain the battery capacity by using the limited space, and it may be more efficient to increase a height of the electrode assembly 200 in the coin-type battery than to increase the diameter.

Figure 6:
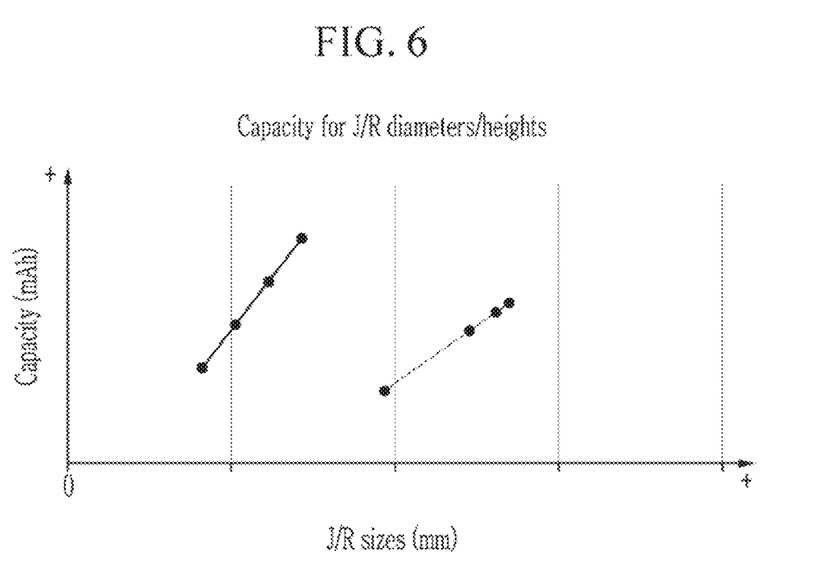
FIG. 6 shows a graph of changes of electrical capacity for respective sizes of an electrode assembly in a rechargeable battery according to an embodiment of the present invention.

FIG. 6 shows a graph on changes of battery capacity with respect to changes of a height of the electrode assembly 200 and changes of battery capacity with respect to changes of diameters of the electrode assembly 200. Referring to FIG. 6, solid lines indicate a result according to the changes of the height of the electrode assembly 200, and dotted lines represent a result according to the changes of the diameter of the electrode assembly 200.

Referring to FIG. 6, it is found that a slope of the solid lines with respect to the change of the height of the electrode assembly 200 is steeper than a slope of the dotted lines with respect to the change of the diameter. In the present experiment, it is found that the increase of the height of the electrode assembly 200 increases the battery capacity by about 1.7 times compared to the increase of the diameter.

Accordingly, an embodiment of the present invention positions the combined unit 252 of the electrode tab 250 on the lateral side of the electrode assembly 200, and does not position the electrode tab 250 on the top side or the bottom side of the electrode assembly 200 to thus draw out the electrode tab 250 to the outside of the pouch, and efficiently obtains a space in the height direction of the electrode assembly 200 and increase the battery capacity.

Regarding the rechargeable battery 100, the electrode tab 250 may include a first extension 254 extending to the second exterior material 140 along the lateral side of the electrode assembly 200, a second extension 256 extending along the terrace portion 150 from the first extension 254 to be drawn out to the outside, and a bending portion 258 connecting between the first extension 254 and the second extension 256 and bent.

Referring to FIG. 2, the first extension 254 of the electrode tab 250 extends from the combined unit 252 with the electrode assembly 200, and may extend to the second exterior material 140 along the lateral side of the electrode assembly 200. That is, the first extension 254 may extend down to the opening of the first exterior material 120 from the combined unit 252 with the electrode assembly 200.

A bending portion 258 may be formed on the end portion facing the second exterior material 140 on the first extension 254. The length direction may be changed to the diameter direction of the electrode assembly 200 from the height direction of the electrode assembly 200 through the bending portion 258 of the electrode tab 250.

The second extension 256 may extend along the terrace portion 150 from the bending portion 258. That is, the second extension 256 may extend along the second edge portion 142 of the second exterior material 140 from the bending portion 258 and may be drawn out to the outside of the pouch.

Therefore, as the first extension 254, the bending portion 258, and the second extension 256 are formed on the electrode tab 250, an embodiment of the present invention may efficiently draw out the electrode tab 250 to the outside of the pouch while the electrode tab 250 is combined to the lateral side of the electrode assembly 200 and the reinforcing member 130 is disposed on the lateral side of the electrode assembly 200.

The terrace portion 150 may include a draw-out hole 160 through which the electrode tab 250 passes and is drawn out, and may further include a vent sealing portion 165 sealing the draw-out hole 160 and that is broken when an internal pressure of the first exterior material 120 increases.

FIG. 1 and FIG. 2 illustrate a vent sealing portion 165 formed on the terrace portion 150 according to an embodiment of the present invention. A draw-out hole 160 is formed in the terrace portion 150 to draw out the electrode tab 250, and a vent sealing portion 165 may be provided in the draw-out hole 160 for complete sealing in the pouch.

The vent sealing portion 165 is charged in the draw-out hole 160 and has less rigidity than the terrace portion 150 combined by the method such as thermal fusion, so when the internal pressure of the pouch increases, a burst may be generated at the vent sealing portion 165 on the entire terrace portion 150 and gas in the pouch may be discharged.

That is, while the gas is generated in the pouch and the internal pressure raises which is an abnormal condition, an embodiment of the present invention eliminates the internal pressure through the burst of the vent sealing portion 165, thereby suppressing an explosion of the rechargeable battery 100 and increasing safety.

The small coin-type battery may be required to simplify its configuration according to spatial limits. An embodiment of the present invention forms the vent sealing portion 165 in the draw-out hole 160 through which the electrode tab 250 is drawn out instead of forming an additional vent portion, thereby simplifying the configuration and efficiently eliminating the internal pressure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 100: rechargeable battery | 120: first exterior material |
| 122: first edge portion | 130: reinforcing member |
| 140: second exterior material | 142: second edge portion |
| 150: terrace portion | 160: draw-out hole |
| 165: vent sealing portion | 190: fixing ring |
| 200: electrode assembly | 210: winding axis |
| 220: first insulating member | 222: through-hole |
| 230: second insulating member | 250: electrode tab |
| 252: combined unit | 254: first extension |
| 256: second extension | 258: bending portion |

The invention claimed is:

1. A rechargeable battery comprising:
an electrode assembly wound with a separator between a first electrode and a second electrode and having a bottom side, a top side, and a lateral side extending between the bottom side and the top side;
an electrode tab extending from the lateral side of the electrode assembly;
a first exterior material including an opening receiving the electrode assembly;

a second exterior material covering the opening, and combined to the first exterior material to seal an internal side of the first exterior material; and a reinforcing member having greater rigidity than the first exterior material and the second exterior material, disposed between the electrode assembly and the first exterior material, and including a side wall for surrounding the lateral side of the electrode assembly from which the electrode tab extends from the electrode assembly, wherein the electrode tab is bent to extend around the reinforcing member to pass between the first exterior material and the second exterior material.

2. The rechargeable battery of claim 1, wherein the reinforcing member further includes an upper wall for surrounding a top side of the electrode assembly and that has a can shape for receiving the electrode assembly.

3. The rechargeable battery of claim 2, wherein the reinforcing member is made of a metal material, and further includes a first insulating member for surrounding the electrode assembly between the electrode assembly and the reinforcing member, and insulating the electrode assembly from the reinforcing member.

4. The rechargeable battery of claim 3, wherein the first insulating member includes a through-hole which the electrode tab penetrates, and wherein the electrode tab is drawn out between the first insulating member and the reinforcing member through the through-hole, and an insulating material is coated on a portion of the electrode tab outside of the first insulating member and contacting the reinforcing member.

5. The rechargeable battery of claim 4, further comprising a second insulating member installed on an external side of the first insulating member to close and seal the through-hole.

6. The rechargeable battery of claim 3, wherein the first exterior material includes a first edge portion surrounding a circumference of the opening and extending away from the opening, wherein the second exterior material includes a second edge portion provided on the first edge portion, the first edge portion and the second edge portion together form a terrace portion, and wherein the electrode tab passes through the terrace portion and is drawn out to an outside of the first exterior material.

7. The rechargeable battery of claim 6, wherein the terrace portion is folded to be closely attached to an exterior side of the first exterior material.

8. The rechargeable battery of claim 7, further comprising a fixing ring for surrounding the folded terrace portion and fixing the terrace portion to be closely attached to the exterior side of the first exterior material.

9. The rechargeable battery of claim 6, wherein the electrode tab is combined to the lateral side of the electrode assembly and is drawn out to the outside.

10. The rechargeable battery of claim 9, wherein the electrode tab includes:

a first extension extending to the second exterior material along the lateral side of the electrode assembly;

a second extension extending along the terrace portion from the first extension and drawn out to the outside; and a bending portion connecting between the first extension and the second extension and that is bent.

11. The rechargeable battery of claim 6, wherein the terrace portion includes a draw-out hole through which the electrode tab penetrates and is drawn out, and further includes a vent sealing portion sealing the draw-out hole and bursting when an internal pressure of the first exterior material increases.

12. The rechargeable battery of claim 1, wherein the rechargeable battery has a coin shape in which a ratio of diameter to height is equal to or greater than 1.

* * * * *